(12) United States Patent
Fishman

(10) Patent No.: US 8,754,024 B1
(45) Date of Patent: Jun. 17, 2014

(54) LIQUEFIED-GAS AEROSOL DUSTING COMPOSITION CONTAINING SUCROSE OCTAACETATE

(71) Applicants: Michael Scott Fishman, Coral Springs, FL (US); Neal Markus, Hollywood, FL (US)

(72) Inventor: Michael Fishman, Coral Springs, FL (US)

(*) Notice: Subject to any disclaimer, the term of this patent is extended or adjusted under 35 U.S.C. 154(b) by 13 days.

(21) Appl. No.: 13/776,837

(22) Filed: Feb. 26, 2013

(51) Int. Cl.
*C11D 3/24* (2006.01)

(52) U.S. Cl.
USPC ............ 510/412; 510/204; 510/213; 510/406

(58) Field of Classification Search
USPC .................................. 510/204, 213, 406, 412
See application file for complete search history.

(56) References Cited

U.S. PATENT DOCUMENTS

| | | | | |
|---|---|---|---|---|
| 3,800,033 | A * | 3/1974 | Flawn et al. | 424/47 |
| 5,167,950 | A * | 12/1992 | Lins | 424/47 |
| 5,281,409 | A * | 1/1994 | Thayer et al. | 424/47 |
| 2006/0204446 | A1* | 9/2006 | Lulla et al. | 424/45 |
| 2008/0188393 | A1* | 8/2008 | Creazzo et al. | 510/406 |
| 2008/0260658 | A1* | 10/2008 | Winter et al. | 424/47 |

* cited by examiner

*Primary Examiner* — Charles Boyer

(57) ABSTRACT

A liquefied-gas aerosol dusting composition for preventing inhalation abuse incidents. The composition comprises at least one liquefied gas and Sucrose Octaacetate wherein the concentration of said aerosol dusting composition ranges from 5 ppm to about 50 ppm.

12 Claims, 2 Drawing Sheets

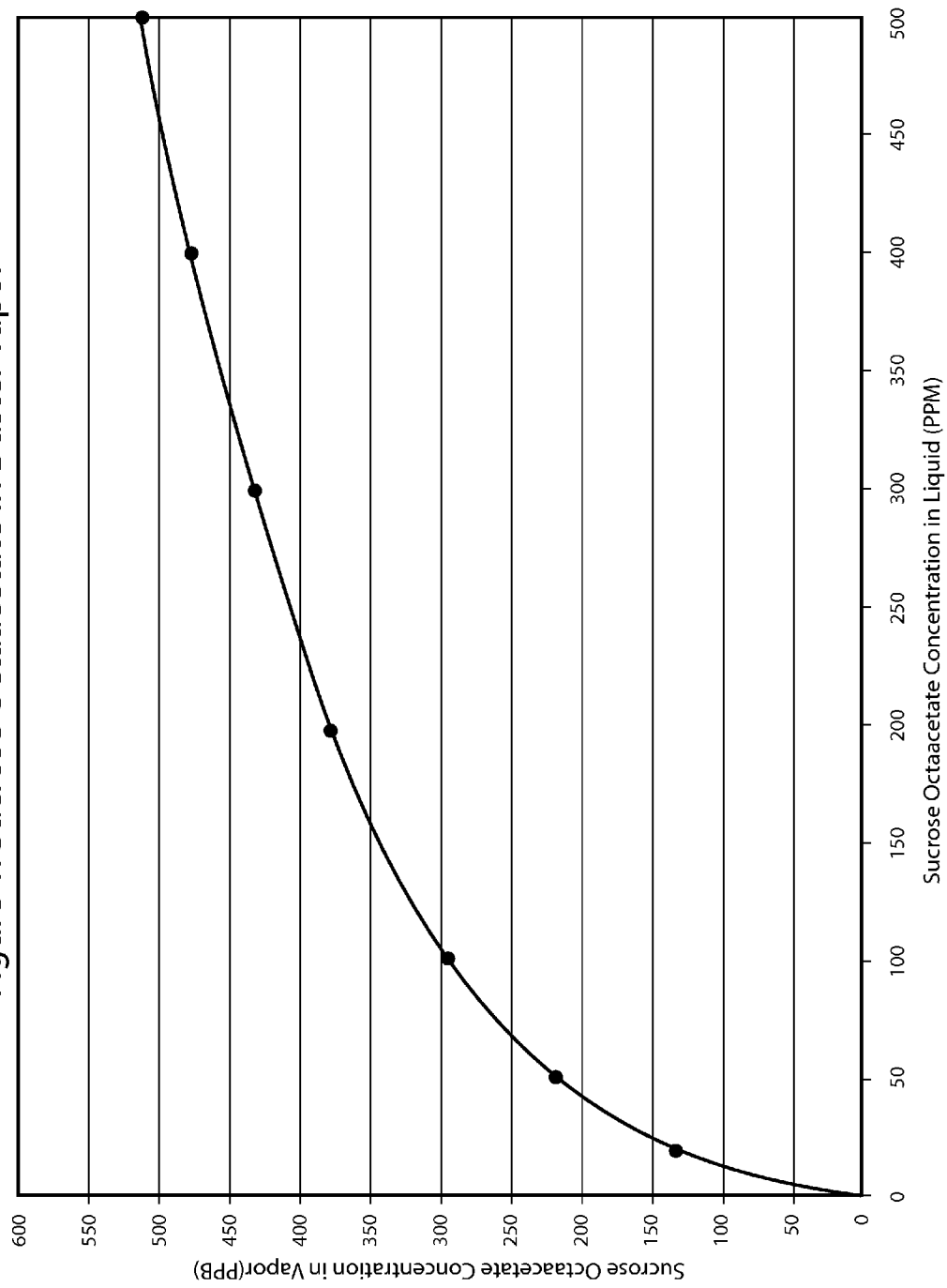

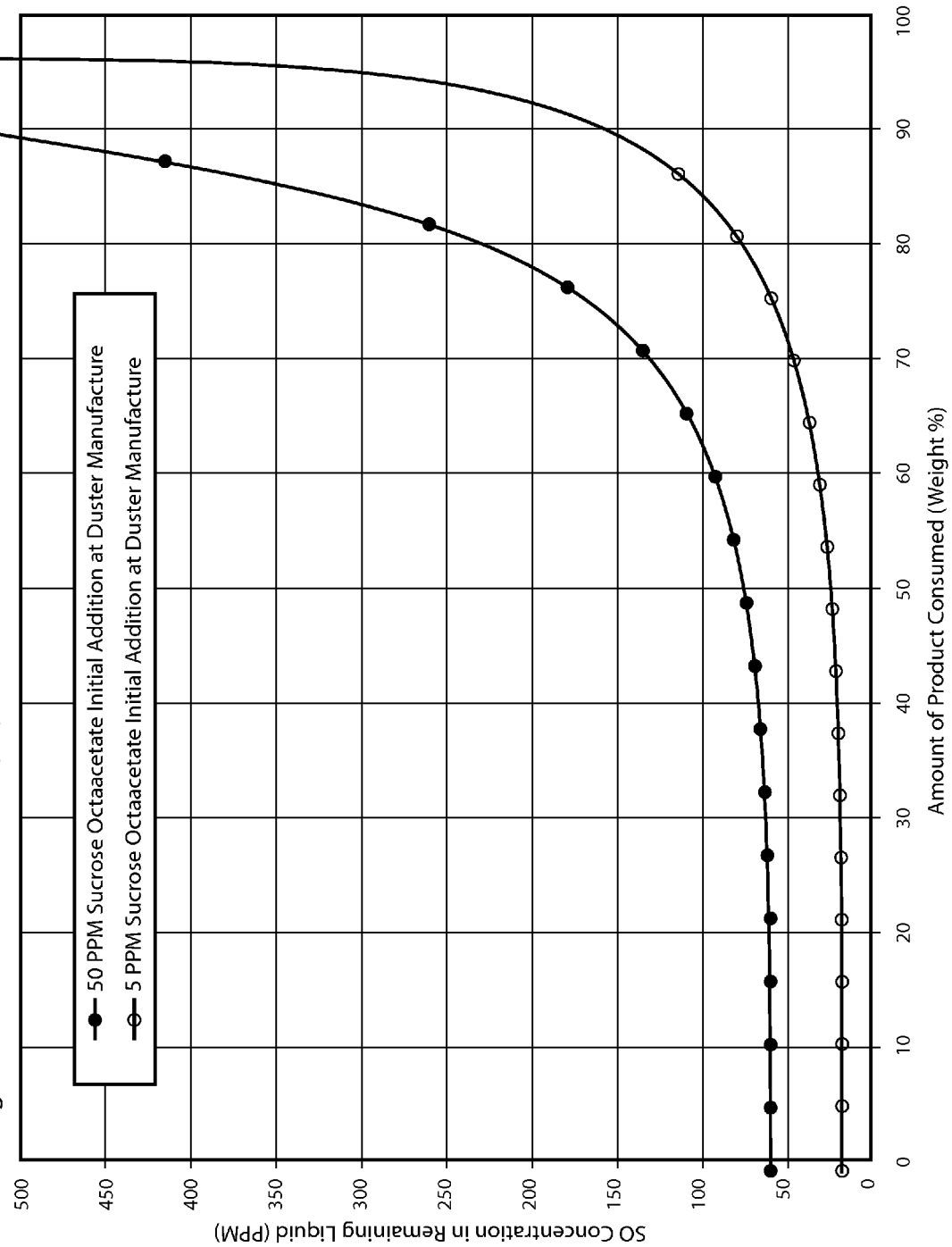

LIQUEFIED-GAS AEROSOL DUSTING COMPOSITION CONTAINING SUCROSE OCTAACETATE

CROSS-REFERENCE TO RELATED APPLICATIONS

None

FEDERALLY SPONSORED RESEARCH none

SEQUENCE LISTING

None

BACKGROUND

The present invention relates to a denatured liquefied gas aerosol dusting composition. In particular the present invention relates to a liquefied-gas aerosol dusting composition containing Sucrose Octaacetate. Liquefied aerosol dusters are a safe and useful way to clean hard to clean areas. They are used for a variety of different uses including to clean sewing machines, keyboards, computers, workbenches, printers and silk flowers. If not cleaned regularly such as computer fans the equipment can break down from dust buildup. The pressurized gas in aerosol dusters delivers a burst of gas and when used with a straw to pin point accuracy. The aerosol valve and actuator can be configured to give the best burst of gas for the user.

The manufacturer of these aerosol dusters expend significant time and resources to providing a safe product when used as intended. Aerosol dusters provide a great service to the everyday user however sometimes aerosol air dusters are involved with inhalant abuse incidents like other aerosol products on the market today. Although manufacturers spend significant sums of money to educate the consumer about the dangers of inhalant abuse as well as post education material on websites to discourage such activities However in an effort to take yet one more step to discourage inhalant abuse companies have looked to design and formula of the product to discourage the potential abusers. One such available way to discourage the potential abuser is to formulate a product that includes a Denaturant in the aerosol duster that can be detected when the abuser attempts to huff the product but not in the normal use of the product. Denaturants considered include methanol, thymol, eucalyptol, vinegar, and denatonium benzoate and sucrose Octaacetate.

Sucrose Octaacetate is a bitter substance that can be detected at very low levels and can be detected by human taste as low as 50 pph. Thus Sucrose Octaacetate can be used as a denaturant. In fact the Consumer Product Safety Final Report of the Study of Aversive Agents listed it to be twice that of Denatonium Benzoate.

However if the Sucrose Octaacetate concentration is too high the Sucrose Octaacetate can interfere with the normal product use. Also when the Sucrose Octaacetate is too low it becomes ineffective as a deterrent to accidental and intentional inhalant abuse.

There is a need for a liquefied gas aerosol duster composition with a bittering additive agent that does not interfere with the normal use of the product but does interfere and strongly discourage potential inhalant abuse of the product.

SUMMARY OF THE INVENTION

A liquefied gas aerosol dusting composition that has been designed to discourage inhalant abuse incidents. The composition is at least one liquefied gas and Sucrose Octaacetate wherein the concentration of said Sucrose Octaacetate in the aerosol duster ranges from 5 ppm to about 50 pm.

BRIEF DESCRIPTION OF THE DRAWINGS

Embodiments are illustrated in the accompanying figures to improve understanding presented herein:

FIG. 1 Shows the Sucrose Octaacetate distribution between the liquid phase and vapor phase in a duster can. The Sucrose Octaacetate will be dispensed at a level lower than the addition level to the liquid when the solution volatizes and vapor is discharged from the can. The evaporating liquid only carries trace portions of the added Sucrose Octaacetate to the vapor shown in FIG. 1.

FIG. 2 shows the calculated concentrations of Sucrose Octaacetate in the remaining liquid as the product is consumed.

DETAILED DESCRIPTION OF THE DRAWINGS

Before addressing the exact embodiments of this invention a description of terms should be defined for full disclosure.

The term "liquefied gas" is a chemical compound or compounds that are in a liquefied state under pressure. Liquified gases used in aerosols include 1,1-difluoroethane(HFC-152a), 1,1,1 2 tetrafluoroethane, (HFC-134a), dimethylether, and other hydrocarbons which can include propane, butane and pentanes and isomers.

The term Sucrose Octaacetate is intended to mean Acetic acid [(2S,3S,4R,5R)-4-acetoxy 2,5-bis(acetoxymethyl)-2-[[(2R, 3R,4S,5R,6R)-3,4,5-triacetoxy-6-(acetoxymethyl)-2-tetrahydropyranyl]oxy]-3-tetrahydrofuranyl]ester and CAS number being 126-14-7 and written chemical formula being $C_{28}H_{38}O_{19}$.

Alcohols include ethanol, propanols and butonols and other isomers.

The term "ppm" is intended to mean parts per million by weight.

The term "ppb" is intended to mean parts per billion by weight.

A liquefied gas aerosol dusting composition has been provided to discourage inhalation abuse incidents, the composition includes at least one liquefied gas and Sucrose Octaacetate wherein the concentration of said Sucrose Octaacetate in said aerosol dusting composition ranges from about 5 ppm and 50 ppm.

The Sucrose Octaacetate can be dissolved in the liquefied gas by suitable means such as by mixing or dissolving in water or alcohol or other dissolving agent. In one embodiment of the invention the Sucrose Octaacetate is mixed with a cosolvent and then mixed into the liquefied gas.

When the liquefied gas dusting aerosol is in the container the liquid vapor phase equilibrium in a container the concentration of the Sucrose Octaacetate in the vapor phase is lower than that in the liquid phase of FIG. 1. When the liquefied gas dusting aerosol is consumed and discharged as a vapor the concentration of the Sucrose Octaacetate in the liquefied gas of the remaining composition in the can will increase as shown in FIG. 2 and consequently so will the Sucrose Octaacetate in the vapor phase.

When the vapor is discharged from the aerosol container contains 50 to 500 ppb of Sucrose Octaacetate the Sucrose Octaacetate does not interfere with normal product use but is detectable to the potential abuser and discourages this form of activity. The 50 ppb of the Sucrose Octaacetate is high enough to be detected if the vapor contacts the mouth but more than 500 ppb interferes with normal use of the product.

To achieve about 50 ppb to about 500 ppb in the vapor phase from FIG. 1 the Sucrose Octaacetate should be kept between 5 ppm and 500 ppm. The Sucrose Octaacetate will concentrate in remaining liquid and this is why it should be between this level. FIG. 2 shows that upon initial production by the manufacturer of the product that keeping between 5 ppm and 500 ppm through 90 percent use. Therefore an initial Sucrose Octaacetate to the liquefied gas to the range of 5 ppm and 50 ppm will yield a vapor concentration of 50 ppb to 500 ppb Sucrose Octaacetate through 90 percent of can making it undetectable during normal use.

EXAMPLES

Example 1

These experiment was conducted in glass aerosol bottles HFC-152a was treated with Sucrose Octaacetate in two ways.
1. Simply adding Sucrose Octaacetate in solid particles to the HFC-152a
2. Dissolving Sucrose Octaacetate with alcohol and then adding a small amount of the Sucrose Octaacetate solution to HFC-152a.
Four samples were prepared.
Sample
0.11 g Sucrose Octaacetate in 101.5 g 152a 1175 ppm
0.0037 g Sucrose Octaacetate in 100 g 152a 37 ppm
4.9 g solution (1.g Sucrose Octaacetate/10 g alcohol to 556 HFC-152a 902 ppm
1 g solution (0.1 g Sucrose Octaacetate/10 g alcohol to 100 g HFC-152a 100 ppm
When the samples were used as dusters that is spraying to clear dust the user could detect a bitter taste from the Sucrose Octaacetate concentrations of 1000 ppm. The user did not smell an odor with concentrations of 36 or 100 ppm Sucrose Octaacetate concentrations.

Example 1 shows a method of making the Sucrose Octaacetate composition comprising 1,1 difluoroethane(HFC-152a) and about 37-1175 ppm Sucrose Octaacetate. Example 1 shows that 37-100 ppm does not interfere with product use. Example 1 also shows that 902-1175 ppm will interfere with normal product use.

Example 2 demonstrates that a liquefied gas aerosol dusting composition with up to 48 ppm Sucrose Octaacetate does not interfere with normal product use.

A single blind randomized sample was done with volunteer users. The objective of the study was to determine if potential users could detect odor during normal use when the duster was sprayed. The test was HFC-152a with no bitterant inside, a sample of HFC-152a duster with 10 ppm Sucrose Octaacetate and a sample of HFC-152a with 58 ppm Sucrose Octaacetate. 100 people were enrolled in the tests.

To test the products a lab technician sprayed the contents of the aerosol duster sample toward an 3×5 index card three times for 6 seconds from a distance of 5 inches. The volunteers were told to sniff the air over the card and detect if they smelled a scent. If the volunteers smelled a scent they marked intensity on 0-10 cm line called a visual analog scale which 0-10 cm endpoint described intensities.

The same procedure was followed for each product sample and started with the sample with no bitterant and then the other two samples with bitterant.

The data was then collected and analyzed. A chi square analysis was used to look at the yes and no answers to the 3 test products. In addition visual analog scale data was done regarding the intensity ratings using a paired t-test. All participants that said "no" they smelled nothing were given "0". An additional chi square analysis was done on the distribution of visual analog scale scores that had "0" for all volunteers that said "no". A final analysis was done on all volunteers who answered "yes" that they had a smelled something because they felt they should because of the test but said they said the sensation was low. Comparative performance differences were considered significant at $p<0.046$ level.

The study showed that under normal use conditions the test subjects were not able able to detect the Sucrose Octaacetate in the product as opposed to the ones with Sucrose Octaacetate.

The invention claimed is:

1. A liquefied gas aerosol dusting composition consisting essentially of 1,1 difluoroethane, Sucrose Octaacetate and alcohol wherein the concentration of said Sucrose Octaacetate in said aerosol dusting agent ranges from about 5 ppm and about 50 ppm.

2. The liquefied gas aerosol dusting composition of claim 1 wherein said alcohol is ethanol.

3. A liquefied gas aerosol dusting composition consisting essentially of 1,1 difluoroethane, hydrocarbon, Sucrose Octaacetate and alcohol wherein said aerosol dusting composition ranges from 5 ppm to about 50 ppm.

4. The liquefied gas aerosol dusting composition of claim 3 wherein said alcohol is ethanol.

5. The liquefied gas aerosol dusting composition of claim 3 wherein said hydrocarbon is selected from a group consisting of propanes, butanes, pentanes and isomers thereof.

6. A liquefied gas aerosol dusting composition consisting essentially of 1,1,1,2-tetrafluoroethane, Sucrose Octaacetate and alcohol wherein the concentration of said Sucrose Octaacetate in said aerosol dusting agent ranges from about 5 ppm and about 50 ppm.

7. The liquefied gas aerosol dusting composition of claim 6 wherein said alcohol is ethanol.

8. A liquefied gas aerosol dusting composition consisting essentially of 1,1,1,2-tetrafluoroethane, hydrocarbon, Sucrose Octaacetate and alcohol wherein the concentration of said Sucrose Octaacetate in said aerosol dusting agent ranges from about 5 ppm and about 50 ppm.

9. The liquefied gas aerosol dusting composition of claim 8 wherein said alcohol is ethanol.

10. The liquefied gas aerosol dusting composition of claim 8 wherein said hydrocarbon is selected from a group consisting of propanes, butanes, pentanes and isomers thereof.

11. A liquefied gas aerosol dusting composition consisting essentially of 1,1 difluoroethane, 1,1,1,2-tetrafluoroethane, Sucrose Octaacetate and alcohol wherein the concentration of said Sucrose Octaacetate in said aerosol dusting agent ranges from about 5 ppm and about 50 ppm.

12. The liquefied gas aerosol dusting composition of claim 11 wherein said alcohol is ethanol.

\* \* \* \* \*